US010789683B2

(12) United States Patent
Carmi et al.

(10) Patent No.: US 10,789,683 B2
(45) Date of Patent: Sep. 29, 2020

(54) METHOD FOR AUTOMATIC OPTIMIZATION OF QUANTITATIVE MAP GENERATION IN FUNCTIONAL MEDICAL IMAGING

(71) Applicant: KONINKLIJKE PHILIPS N.V., Eindhoven (NL)

(72) Inventors: Raz Carmi, Haifa (IL); Galit Sarit Kafri, Haifa (IL)

(73) Assignee: KONINKLIJKE PHILIPS N.V., Endhoven (NL)

( * ) Notice: Subject to any disclaimer, the term of this patent is extended or adjusted under 35 U.S.C. 154(b) by 219 days.

(21) Appl. No.: 15/770,775

(22) PCT Filed: Oct. 28, 2016

(86) PCT No.: PCT/EP2016/076052
§ 371 (c)(1),
(2) Date: Apr. 25, 2018

(87) PCT Pub. No.: WO2017/080847
PCT Pub. Date: May 18, 2017

(65) Prior Publication Data
US 2018/0322617 A1  Nov. 8, 2018

(30) Foreign Application Priority Data
Nov. 10, 2015  (EP) .................... 15193896

(51) Int. Cl.
*G06K 9/00* (2006.01)
*G06T 5/00* (2006.01)
(Continued)

(52) U.S. Cl.
CPC ............... *G06T 5/002* (2013.01); *G06T 5/50* (2013.01); *G06T 7/0012* (2013.01);
(Continued)

(58) Field of Classification Search
CPC ......... G06T 5/002; G06T 11/003; G06T 5/50; G06T 7/0012; G06T 2207/30056; G06T 2207/10081; G06K 9/3233
(Continued)

(56) References Cited

U.S. PATENT DOCUMENTS

2006/0215889 A1  9/2006  Omi
2008/0175457 A1  7/2008  Watson
(Continued)

FOREIGN PATENT DOCUMENTS

| CA | 2534701 | 7/2007 |
| WO | 2014097124 | 6/2014 |
| WO | 2014207139 | 12/2014 |

OTHER PUBLICATIONS

Ting Xia et al., "Paper; Ultra-low dose CT attenuation correction for PET/CT" Physics in Medicine and Biology, Institute of Physics Publishing; vol. 57, No. 2, Dec. 9, 2011. (Year: 2011).*
(Continued)

*Primary Examiner* — Van D Huynh
(74) *Attorney, Agent, or Firm* — Larry Liberchuk (57) ABSTRACT

The current application relates to an optimization procedure where the noise reduction strength is incrementally increased and applied in the noise reduction scheme. A non-linear quantitative map is then computed followed by the quantitative bias estimation. The optimization conditions are then checked and the noise reduction "strength" is increased if the bias difference is higher than a predefined threshold.

15 Claims, 6 Drawing Sheets

(51) Int. Cl.
*G06T 7/00* (2017.01)
*G06T 5/50* (2006.01)
*G06T 11/00* (2006.01)
*G06K 9/32* (2006.01)

(52) U.S. Cl.
CPC .......... *G06T 11/003* (2013.01); *G06K 9/3233* (2013.01); *G06T 2207/10081* (2013.01); *G06T 2207/30056* (2013.01)

(58) Field of Classification Search
USPC ........................................................ 382/131
See application file for complete search history.

(56) References Cited

U.S. PATENT DOCUMENTS

| 2009/0206838 | A1* | 8/2009 | Noterdaeme | .... | G01R 33/56563 |
| | | | | | 324/309 |
| 2011/0208039 | A1* | 8/2011 | Guehring | ........... | G01R 33/5659 |
| | | | | | 600/410 |
| 2013/0079626 | A1* | 3/2013 | Shmatukha | .......... | A61B 6/5205 |
| | | | | | 600/420 |
| 2013/0223714 | A1 | 8/2013 | Lipton | | |
| 2013/0266198 | A1* | 10/2013 | Pereira | .................. | G06T 7/0012 |
| | | | | | 382/131 |
| 2016/0071263 | A1* | 3/2016 | Thiruvenkadam | ..... | A61B 6/037 |
| | | | | | 382/131 |
| 2017/0128025 | A1* | 5/2017 | Chen | .................... | A61B 5/7278 |

OTHER PUBLICATIONS

Lingfeng Wen et al., "Effect of Reconstruction and Filtering on Kinetic Parameter Estimation Bias and Reliability for Dynamic SPECT: A Simulation Study" IEEE Transactions on Nuclear Science, vol. 52, No. 1, Feb. 2005. (Year: 2005).*

Xia, et al., "Paper; Ultra-low dose CT attenuation correction for PET/CT" Physics in Medicine and Biology, Institute of Physics Publishing; vol. 57, No. 2, Dec. 9, 2011.

Alessio Adam, et al., "Improved quantitation for PET/CT image reconstruction with system modeling and anatomical priors"; Medical Physics; vol. 33, No. 11, Oct. 17, 2006.

Schilham, et al., "Local Noise Weighted Filtering for Emphysema Scoring of Low-Dose CT Images"; IEEE Transactions on Medical Imaging, vol. 25, No. 4, Apr. 1, 2006.

* cited by examiner

METHOD FOR AUTOMATIC OPTIMIZATION OF QUANTITATIVE MAP GENERATION IN FUNCTIONAL MEDICAL IMAGING

CROSS REFERENCE TO RELATED APPLICATIONS

This application is the U.S. National Phase application under 35 U.S.C. § 371 of International Application No. PCT/EP2016/076052, filed Oct. 28, 2016, published as WO 2017/080847 on May 18, 2017, which claims the benefit of European Patent Application Number 15193896.6 filed Nov. 10, 2015. These applications are hereby incorporated by reference herein.

The invention relates to a method and device to the field of medical imaging. It finds particular application to computed tomography (CT).

BACKGROUND

Advanced medical imaging methods are increasingly targeting at functional analysis, characterization and classification of diseases, assessment of biological processes and response to medical treatment. In this field it is frequently crucial to provide accurate quantitative maps which are resultant from relevant mathematical analyses of medical imaging data such as CT, MRI or PET images.

In many cases, the algorithms for calculating the quantitative maps are essentially based on non-linear mathematical functions such as those including 'min', 'max', 'median', 'log', and other operators. As an opposite example, a simple 'mean' is a linear function as well as classical tomographic reconstruction methods such as CT filtered back-projection. One well known phenomenon which occurs whilst using non-linear transformations is the 'noise-induced bias effect'. In this case, noise in the original data are causing not only to propagating noise in the calculated non-linear transformation but also to a quantitative bias which can affect results in a more global sense.

Typical occurrences of the afore-mentioned problem happen in dynamic contrast enhanced CT, which can be used to calculate blood perfusion in tissues. The perfusion analysis is essentially based on measuring the 'max' of the time attenuation curve—using additional calculations in the whole algorithm—hence using a non-linear function. The image noise in the original CT image set will cause to a quantitative bias in the perfusion assessment. This bias cannot be eliminated easily from the final perfusion maps. Indeed, smoothing or averaging on Region of Interest in the final map do not allow to getting rid of the bias. Therefore applying intense noise reduction on the original CT image data before applying the quantitative analysis is a common solution. Intense noise reduction usually comes with sacrificing spatial resolution, which is also an important characteristic for reliable and accurate diagnostics. Therefore, it is important to find ways for accurate and automatic optimization between, on one hand, the bias and noise reduction from the final quantitative maps, and on the other hand, the spatial resolution and image contrast in these quantitative maps.

Ad-hoc solutions such as tailored pre-sets are very problematic and unreliable since the original data can vary significantly according to patients, imaging protocols and imaging modalities.

It is known from WO2014097124 to generate irregularity maps based on local weighted histograms of voxel distribution about voxels of interest from volumetric image data of a subject or object. Said reference also discloses an image noise scaler which can scale the irregularity map to compensate for image noise. It describes using de-noising algorithm to optimize the structure/texture identification relative to the noise level.

Numerous of imaging clinical applications and analyses can be related to the above described aspects. Such applications include but are not limited to perfusion and permeability assessment using dynamic contrast enhanced CT, MRI, PET or SPECT; iodine quantification or other k-edge material quantification using spectral CT; tissue composition analysis in spectral CT (e.g. effective-Z maps); texture or fine-structure analysis of tissues; anatomical structure segmentations; tissue classification; and organ functionality assessment (e.g. cardiac, liver, brain, renal, etc.).

The issue is especially relevant in the field of functional CT, as it is very important to enable reliable functional assessment using low dose CT protocols which usually cause to relatively high image noise.

TING XIA ET AL: "Paper; Ultra-low dose CT attenuation correction for PET/CT; Ultra-low dose CT attenuation correction for PET/CT", PHYSICS IN MEDICINE AND BIOLOGY, INSTITUTE OF PHYSICS PUBLISHING, BRISTOL GB, vol. 57, no. 2, 9 Dec. 2011, pages 309-328, XP020216224, ISSN: 0031-9155, DOI: 10.1088/0031-9155/57/2/309, discusses the use of various smoothing set-ups to obtain optimum bias results as a function of different machine set-ups. The work is performed on dedicated known structures.

ALESSIO ADAM ET AL: "Improved quantitation for PET/CT image reconstruction with system modeling and anatomical priors", MEDICAL PHYSICS, AIP, MELVILLE, N.Y., US, vol. 33, no. 11, 17 Oct. 2006, pages 4095-4103, XP012091919, ISSN: 0094-2405, DOI: 10.1118/1 .235819, discussing simulation of smoothing applied to PET images. Different smoothing set-ups are mentioned in a study based on previously captured images.

SUMMARY OF THE INVENTION

The invention seeks to address the above mentioned technical problem and is related to a method for automatic optimization of quantitative map generation in functional medical imaging comprising:
 a. applying an initial noise reduction level of a noise-reduction scheme to an initial set of medical imaging data to generate an initial set of quantitative maps,
 b. setting a new noise reduction level of the noise reduction scheme to a value being higher than the value of the last noise reduction level of the noise reduction scheme,
 c. applying the new noise reduction level of the noise reduction scheme to the initial set of medical imaging data to generate a new set of quantitative maps,
 d. estimating a mean quantitative bias difference based on the last two sets of quantitative maps,
 e. if the estimated mean quantitative bias difference is higher than a given threshold, repeating steps b to e,
 f. applying the last noise reduction level of the noise reduction scheme to a set of medical imaging data of interest, the set of imaging data of interest comprising the initial set of medical imaging data.

In step b, applying higher noise reduction level usually results in lower image noise in the used imaging data.

Step e consists in increasing the noise reduction level until the mean quantitative bias is considered low enough. As a matter of fact, as long as the mean quantitative bias is higher than a given threshold, the noise reduction level is increased again (step b), new maps are generated based on said increased noise reduction level (step c), a new mean quantitative bias difference is estimated from said new and previous maps (step d) and compared to the given threshold (step e). When the mean quantitative bias difference eventually reaches the given threshold, since condition of step e (the estimated mean quantitative bias difference is higher than a given threshold) is not met, steps b to e are not repeated anymore and the method proceed to step f. Step f consists in applying the last noise reduction level, which is, by construction, the lowest tested noise reduction level allowing to get a mean quantitative bias difference lower than the given threshold.

Note that in the described method, the bias difference is compared to a threshold and not the absolute bias of a single iteration. This is because it is very problematic to estimate what is the portion of a true signal and what is the portion of the artifact bias component in a single map result.

However under some circumstances, e.g. when know organ model is available, the functional map bias may be estimated from a single iteration and not from the difference of two successive iterations.

The mean bias difference can be used for optimization assessment. Such optimization can, for example, correspond to determine the optimal compromise between bias, noise, contrast-resolution, and spatial-resolution.

The set of medical imaging data of interest is preferably chosen among 3D or 4D image sets, or sinograms from an earlier step of a tomographic reconstruction.

The level of noise reduction can be either a strength level of noise reduction or an intensity level of noise reduction.

The method according to the invention can comprise at least one more image processing step between step c and step d. Said step, which could be numbered c', can allow a better estimation of the mean quantitative bias difference. Step c' is preferably an image reconstruction step. Step c' would be iterated together with steps b to e when the condition of step e will be met.

The threshold to which the mean quantitative bias is compared can be a function of another parameter, preferably a percentage of said parameter, or, as another option, a predetermined constant value.

The initial noise reduction level can interestingly be selected from a pre-determined list in accordance with imaging and/or clinical conditions. Indeed, depending on the patient, the organ and the medical imaging device, it is possible to estimate an interval in which the noise reduction shall be determined. Therefore, all of the noise reduction level values used in the method according to the invention can actually be chosen among such interval. Specifically, the way the noise reduction level is set in step b can be monitored prior to the execution of the method according to the invention. The value of the noise reduction level set in step b can depend on imaging and/or clinical conditions.

The difference between the value of the new noise reduction level and the value of the last noise reduction level of the noise reduction scheme can be the same each time step b is performed. That means that each time step b is iterated (due to the condition of step e being verified), the noise reduction level is increased by the same constant value. Another option is to have this value depend on the preceding value, or in the gap between the last estimated mean quantitative bias and the given threshold. More generally, the difference between the value of the new noise reduction level and the value of the last noise reduction level of the noise reduction scheme can be chosen according to a pre-determined algorithm each time step b is performed.

The initial set of medical data can correspond to a region of interest chosen automatically. Another option is to select a region of interest manually.

The invention also relates to a medical imaging device configured to implement a method according to the invention.

The invention also relates to a computer readable storage medium encoded with computer readable instructions, which, when executed by a processor, causes the processor to perform a method according to the invention.

BRIEF DESCRIPTION OF THE FIGURES

The invention shall be better understood by reading the following detailed description of an embodiment of the invention and by examining the annexed drawing, on which.

DETAILED DESCRIPTION OF EMBODIMENTS

Figure 1:
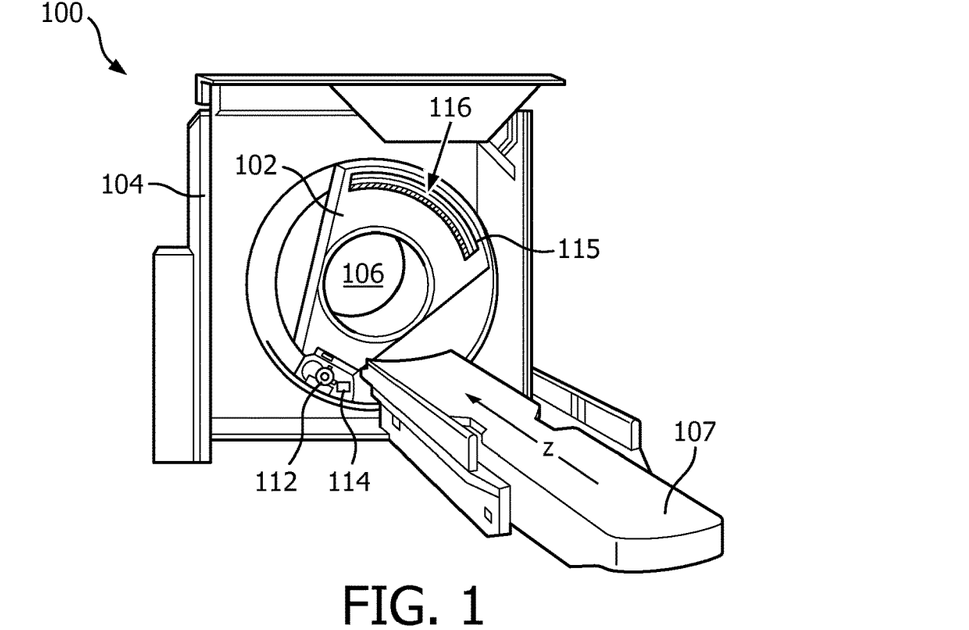
FIG. 1 is a typical Computed Tomography device.

FIG. 1 schematically illustrates an example imaging system 100, such as a computed tomography (CT) scanner. The imaging system 100 includes a rotating gantry 102 and a stationary gantry 104. The rotating gantry 102 is rotatably supported by the stationary gantry 104. The rotating gantry 102 is configured to rotate around an examination region 106 about a longitudinal or z-axis. The imaging system 100 further includes a subject support 107 that supports a subject or object in the examination region 106 before, during and/or after scanning. The subject support 107 can also be used to load and/or unload the subject or object into or from the examination region 106. The imaging system 100 further includes a radiation source 112, such as an x-ray tube, that is rotatably supported by the rotating gantry 102. The radiation source 112 rotates with the rotating gantry 102 around the examination region 106 and is configured to generate and emit radiation that traverses the examination region 106. The imaging system 100 further includes a radiation source controller 114. The radiation source controller 114 is configured to modulate a flux of the generated radiation. For example, the radiation controller 114 can selectively change a cathode heating current of the radiation source 112, apply a charge to inhibit electron flow of the radiation source 112, filter the emitted radiation, etc. to modulate the flux.

The imaging system 100 further includes a one or two dimensional array 115 of radiation sensitive detector pixels 116. The pixels 116 are located opposite the radiation source 112, across the examination region 106, detect radiation traversing the examination region 106, and generate an electrical signal (projection data) indicative thereof. In the illustrated example, the pixels 116 include direct conversion photon counting detector pixels. With such pixels, the generated signal includes an electrical current or voltage having a peak amplitude or a peak height that is indicative of the energy of a detected photon.

Figure 2:
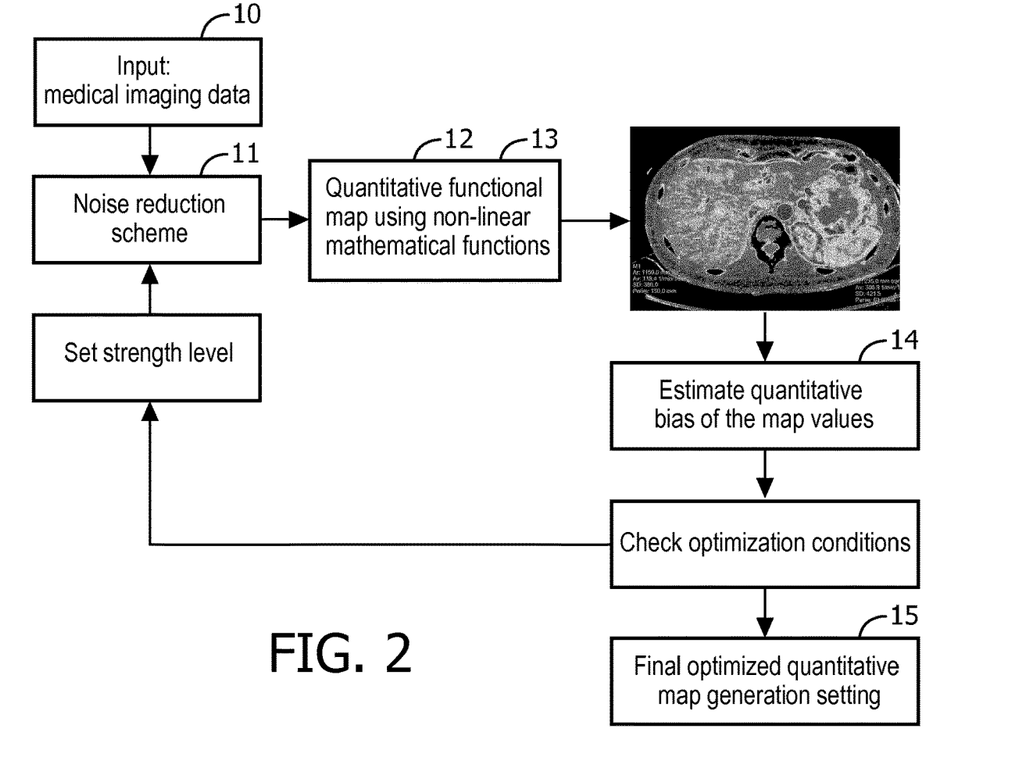
FIG. 2 is a flowchart illustrating the different steps of a method according to the invention

FIG. 2 illustrates the main steps of a method according to the invention: the main inputs of the method according to the invention are the medical imaging data or images 10, the quantitative analysis algorithm which is relevant for the application of interest, and a set of a relevant noise-reduction schemes or parameter space. At the first step 11, an initial noise reduction scheme is applied on the imaging data or a sub-set, e.g. using the lowest noise reduction strength in the given setting. An initial set of quantitative maps 12 is then generated after applying the initial noise reduction scheme.

In order to start the process of finding the optimal working point of the quantitative map generation, the noise-reduction strength level is increased and it is applied again on the imaging data 10. An additional set of quantitative maps 13 is then generated after applying the noise reduction with the recent updated strength level. Based on the previous and the recent sets of quantitative analysis maps 12, 13, the mean quantitative bias difference is estimated by a dedicated algorithmic procedure 14. The estimated bias difference, and optionally additional conditions, are checked against a pre-defined criterion. If the criterion is not met, an iteration is repeated to test for further increased strength of the noise reduction scheme.

When the criterion is finally met, e.g. after several iterations, the noise-reduction scheme is applied with the recent tested strength level to the whole imaging data volume, and the final non-linear quantitative analysis maps 15 are calculated on the whole imaging volume to give the optimized quantitative analysis.

Figure 3:
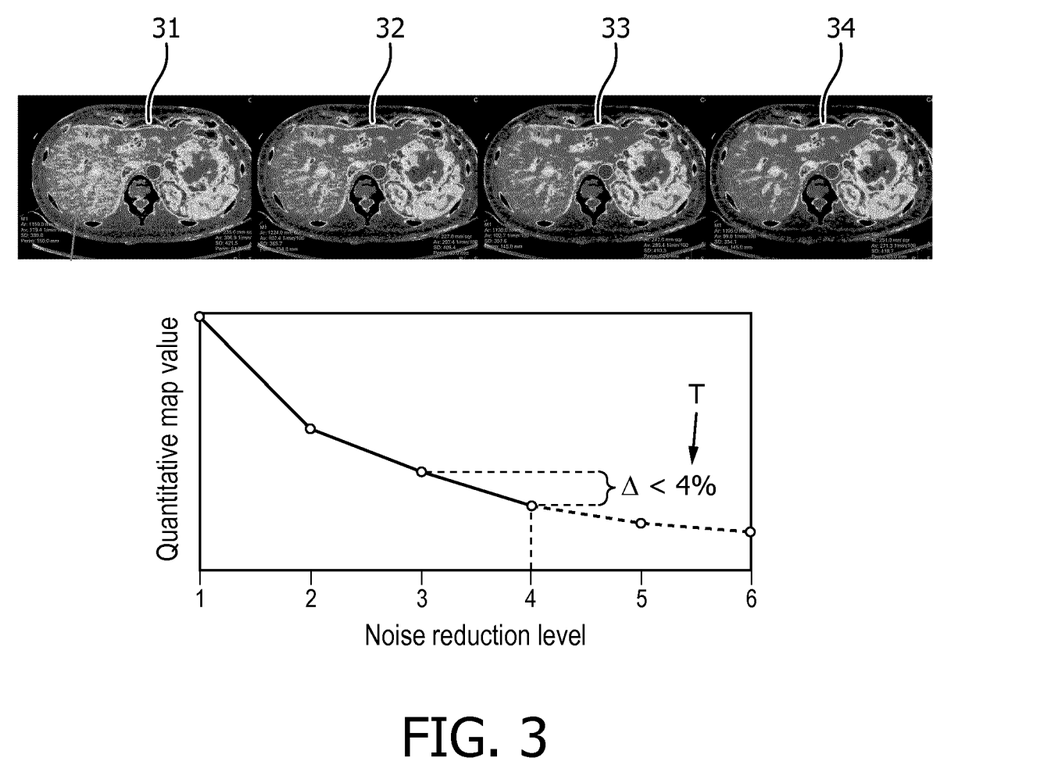
FIG. 3 shows different quantitative maps for different noise reduction levels, FIG. 4 pictures an example of a technique for automatic assessment process of the bias difference between different noise reduction levels.

FIG. 3 illustrates an example of the proposed method in which the noise reduction level, which is applied on dynamic contrast enhanced CT data set before the quantitative analysis, is optimized to provide high quality blood perfusion maps. Here the noise induced bias is demonstrated on the liver parenchyma. The graph shows how the mean value in the selected Region of Interest (ROI) decreases with the noise reduction level. The quantitative maps 31, 32, 33 and 34 correspond to four different values of noise reduction level. In this example, a value bias change of smaller than 4% is used as a threshold T for selecting the optimal working point. As it reflects from the highlighted zone on the quantitative maps, for a noise reduction level which is too small, there is a high bias of the mean value in the quantitative map due to the non-linear analysis function. Said bias cannot be reduced by filtering the final map.

Figure 4:
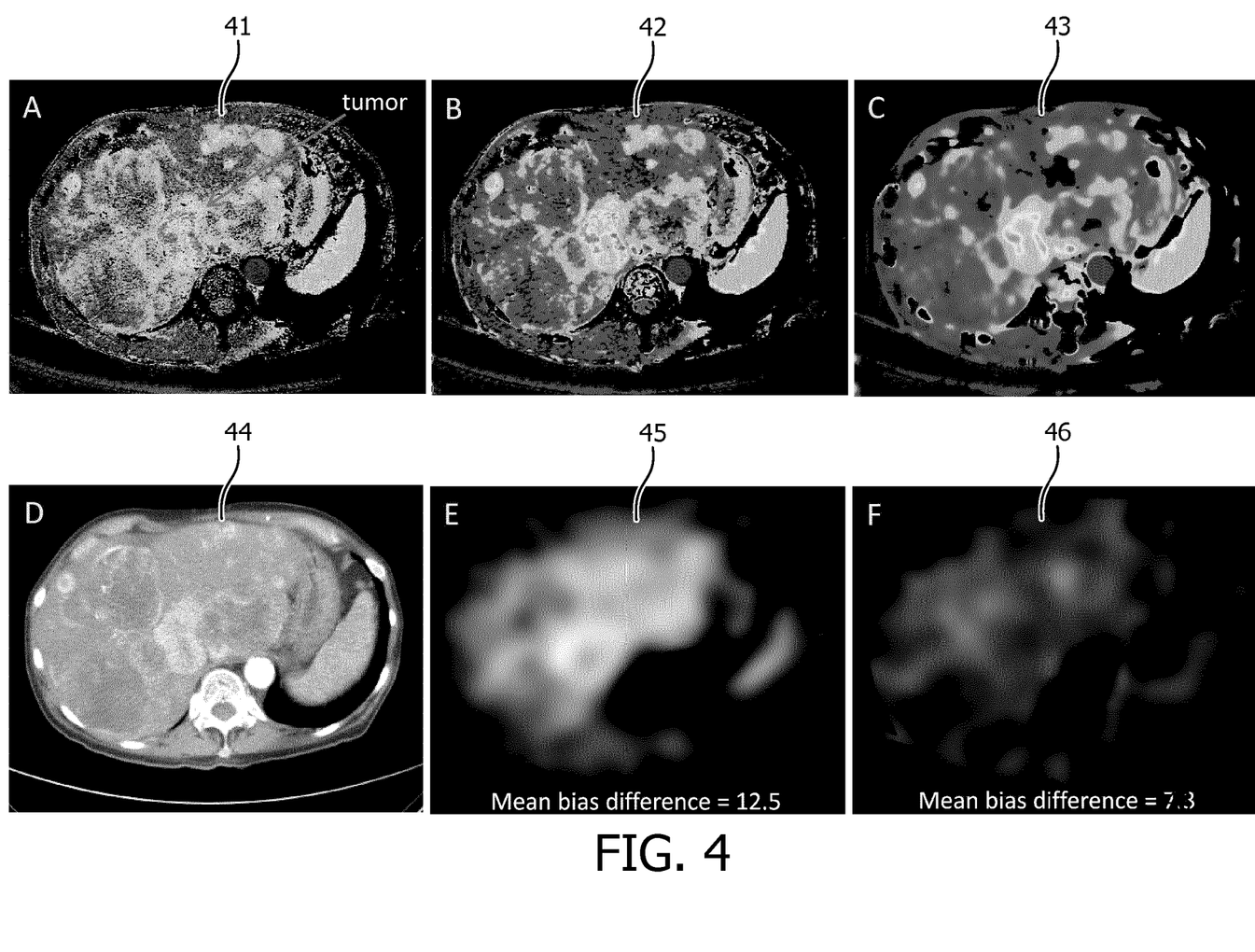

FIG. 4 illustrates an example of a technique for automatic assessment process of the bias difference between different noise reduction levels. FIG. 4 is an example without the need of selecting an ROI. The quantitative maps 41, 42 and 43 in the upper part of the figure corresponds to a same set of imaging data, namely a CT perfusion scan 44 depicted in the lower part of the figure, to which three different levels of noise filtering have been applied respectively. The image 45 represents the difference between maps 41 and 42. It shows high average bias, mainly in the liver and the spleen region. The image 46 represents the difference between maps 41 and 43. It shows moderate average bias in the liver and the spleen region. It is interesting to point out how the intense noise-reduction setting of the image 46 starts degrading the map spatial resolution. The mean bias difference, calculated automatically on the whole imaging volume or on a relevant sub-volume, can be used for the required optimization assessment.

Figure 5:
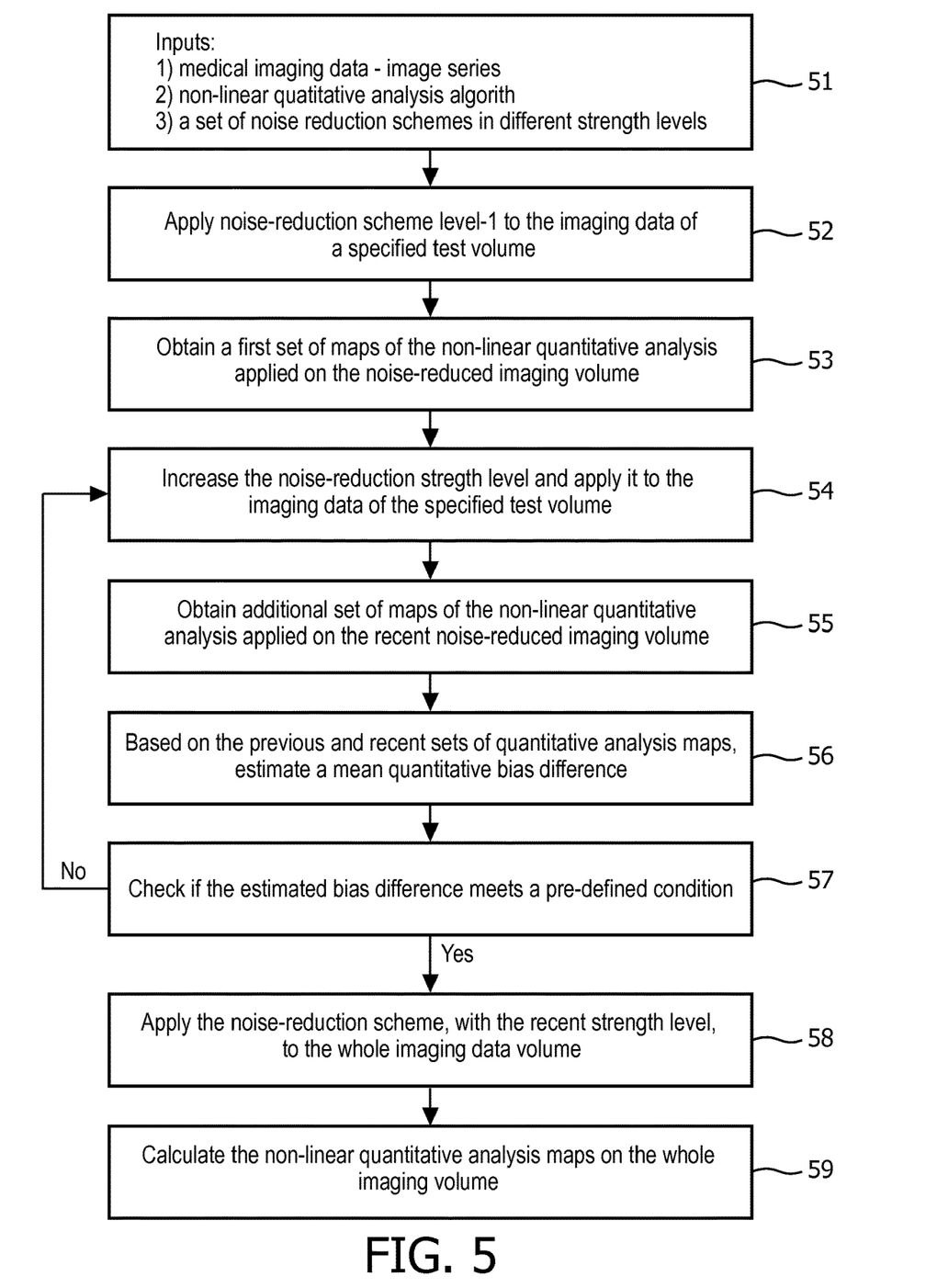
FIG. 5 is a high level flowchart of a method of quantitative map generation optimization according to the invention.

FIG. 5 is a flowchart of the method according to the invention. Box 51 details the main inputs for the method, which are: a) the medical imaging data which are usually 3D or 4D image sets. However, other types of more preliminary data can be also used such as sinograms from an earlier step of a tomographic reconstruction. b) the quantitative analysis algorithm which is relevant for the application of interest. c) a set of noise-reduction schemes which is relevant for the specific type imaging data. The schemes may be ordered according to the intensity or strength of the noise-reduction level. In another option, the steps or order of the different levels may be determined adaptively during the algorithm iterations. During a first step 52, a noise reduction scheme is applied on the imaging data using the lowest strength in the given setting. This may be done on a pre-specified volume, either automatically or manually, or on the whole imaging volume. As an option, reconstruction, registration steps, or any other image processing algorithms may be applied after applying the noise reduction, before applying the quantitative analysis in the next step. In box 53, a first set of quantitative maps are generated after applying the noise reduction with the lowest strength. The noise-reduction strength level is then increased in 54, according to the input schemes, and it is applied again on the imaging data, in order to start the process of finding the optimal working point. On 55, additional set of quantitative maps are generated after applying the noise reduction with the strength level of step 54. Based on the previous and recent sets of quantitative analysis maps, the mean quantitative bias difference is estimated in box 56. This algorithmic process is further detailed in FIG. 6. The estimated bias difference is then checked if it meets a pre-defined condition. The pre-defined condition may be based for example on minimal percentage threshold, or an absolute threshold value, or on another criterion. If the criterion is not met, step 54 is repeated to test for further increased strength of noise reduction. If the criterion is met, the algorithm proceeds to step 58, which consists in applying the noise-reduction scheme with the recent tested strength level to the whole imaging data volume. The final non-linear quantitative analysis maps are eventually calculated on the whole imaging volume to give the optimized quantitative analysis.

The initial noise reduction setting may be selected from a pre-determined list in accordance with the imaging conditions and clinical application. For example, in CT perfusion the setting for a case of liver analysis with 5 mm slice thickness may be different than the setting for a case of pancreas imaging with 3 mm slice thickness. The noise reduction parameter increment between the iterations may be also depend on the specific scan or application.

The iterations in the flowchart above are described as having monotonic change of the noise reduction strength level. However, in another embodiment of the invention, the noise reduction strength levels can be changed in a different scheme or sequence in order to improve the efficiency of the optimization. For example, this can be done by applying known techniques of global minimization algorithms on the parameter space of the noise reduction schemes and while using an appropriate minimization function.

Figure 6:
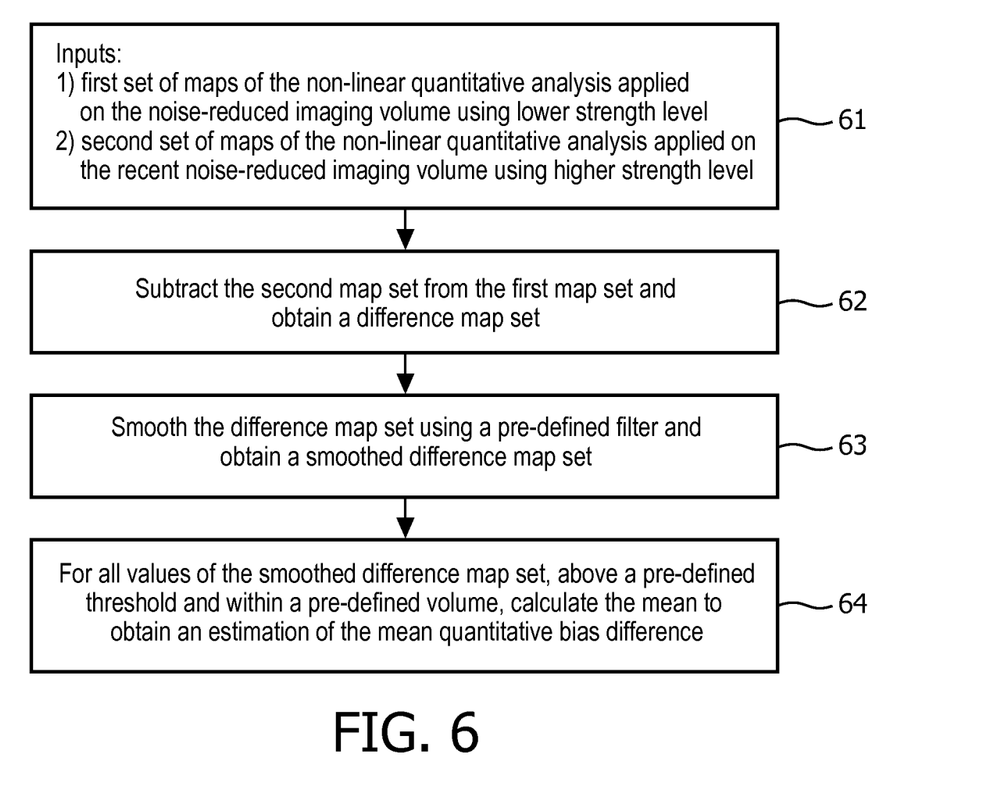
FIG. 6 is a flowchart of a method for estimating a mean quantitative bias difference.

FIG. 6 details the algorithm used to estimate the mean quantitative bias difference in step 56 of FIG. 5. This process is similar to the example in FIG. 4. It can actually be performed fully automatically without needing to select ROI manually. However, selecting a relevant ROI may still be an option in order to provide further accuracy of the optimization. The algorithm consists in subtracting two sets of quantitative maps to obtain a difference map set such as the one depicted in FIGS. 4 (45 and 46). The difference map set can then be smoothed using any kind of suitable filter. Averaging the smoothed difference map set allow estimating the mean quantitative bias.

Figure 7:
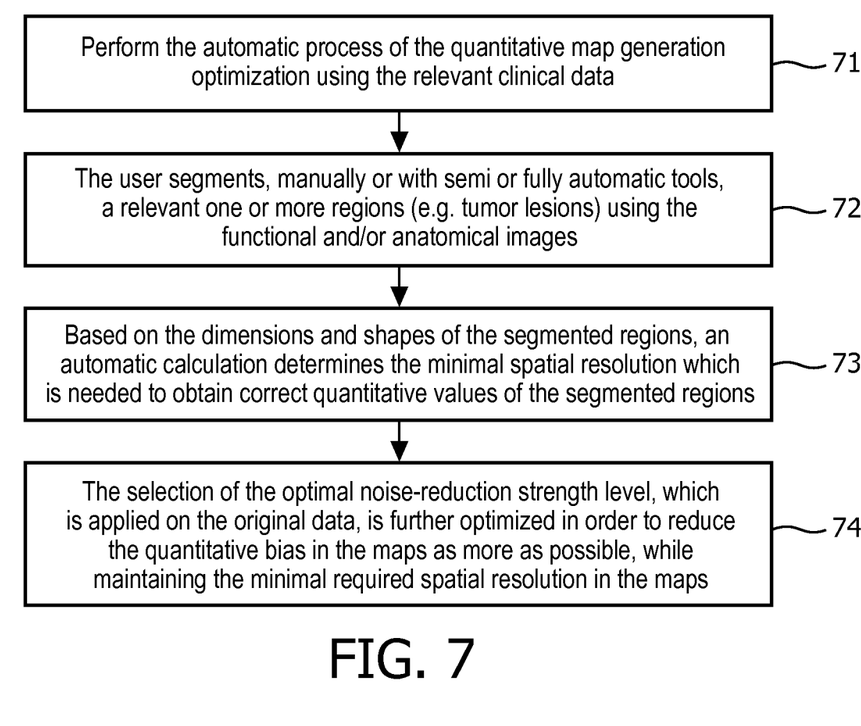
FIG. 7 is a flowchart of a method for optimizing quantitative maps generation.

FIG. 7 shows the above-mentioned optimization process, including further optimization conditions with respect to the quantitative map spatial resolution which can be of interest in some embodiments of the invention. As a first step 71, the automatic process of the quantitative map generation optimization is performed using the relevant clinical data and inputs as described above. When an optimized quantitative map is available based on the process of FIG. 5, the user segments, manually or with semi or fully automatic tools, a relevant one or more regions, e.g. tumor lesions, using the functional and/or anatomical images (step 72). In step 73, based on the dimensions and shapes of the segmented regions, an automatic calculation can then determines the minimal spatial resolution which is needed to obtain correct quantitative values of the segmented regions.

As an option, such determination of the required resolution may be done by fully automatic analysis of the images, or by using a priori information or user parameter selections.

The selection of the optimal noise-reduction strength level, which is applied on the original data, is further optimized in order to reduce the quantitative bias in the maps as much as possible, while maintaining the minimal required spatial resolution in the maps (step 74).

It is worth noting that checking the criteria of required spatial resolution may be done as a second refinement process, i.e. the flowchart of FIG. 5 first, and then the flowchart of FIG. 6, or they can be combined within a single algorithmic process.

Besides the spatial resolution condition, other conditions based on low-contrast resolution or image visualization appearance may be implemented as well.

While the invention has been illustrated and described in detail in the drawings and foregoing description, such illustration and description are to be considered illustrative or exemplary and not restrictive; the invention is not limited to the discussed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for automatic optimization of quantitative map generation in functional medical imaging, comprising:
    a. applying an initial noise reduction level of a noise reduction scheme to an initial set of medical imaging data to generate an initial set of quantitative maps;
    b. setting a new noise reduction level of the noise reduction scheme to a value being higher than a value of the initial noise reduction level of the noise reduction scheme;
    c. applying the new noise reduction level of the noise reduction scheme to the initial set of medical imaging data to generate a new set of quantitative maps;
    d. estimating a mean quantitative bias difference based on the initial set of quantitative maps and the new set of quantitative maps;
    e. if the estimated mean quantitative bias difference is higher than a given threshold, repeating steps b to e;
    f. applying a last noise reduction level of the noise reduction scheme to a set of medical imaging data of interest, the set of medical imaging data of interest comprising the initial set of medical imaging data.

2. The method according to claim 1, the mean quantitative bias difference being used for optimization assessment.

3. The method according to claim 1, the set of medical imaging data of interest being chosen among 3D or 4D image sets, or sinograms from an earlier step of a tomographic reconstruction.

4. The method according to claim 1, the level of noise reduction being a strength level of noise reduction.

5. The method according to claim 1 the level of noise reduction being an intensity level of noise reduction.

6. The method according to claim 1, further comprising at least one image processing step between step c and step d, said step is an image reconstruction step.

7. The method according to claim 1, the threshold being a function of another parameter.

8. The method according to claim 1, the threshold being a predetermined constant value.

9. The method according to claim 1, the initial noise reduction level being selected from a pre-determined list in accordance with imaging and/or clinical conditions.

10. The method according to claim 1, the value of the noise reduction level set in step b depending on imaging and/or clinical conditions.

11. The method according to claim 1, the difference between the value of the new noise reduction level and the value of the latest noise reduction level of the noise reduction scheme being the same each time step b is performed.

12. The method according to claim 1, the difference between the value of the new noise reduction level and the value of the latest noise reduction level of the noise reduction scheme being chosen according to a predetermined algorithm each time step b is performed.

13. The method according to claim 1, the initial set of medical imaging data corresponding to a region of interest chosen automatically.

14. A device configured to implement a method according to claim 1.

15. A non-transitory computer readable storage medium encoded with computer readable instructions, which, when executed by a processor, causes the processor to perform a method according to claim 1.

* * * * *